Feb. 21, 1950     C. M. O'LEARY     2,498,572
HYDROKINETIC BRAKE
Filed Sept. 8, 1947
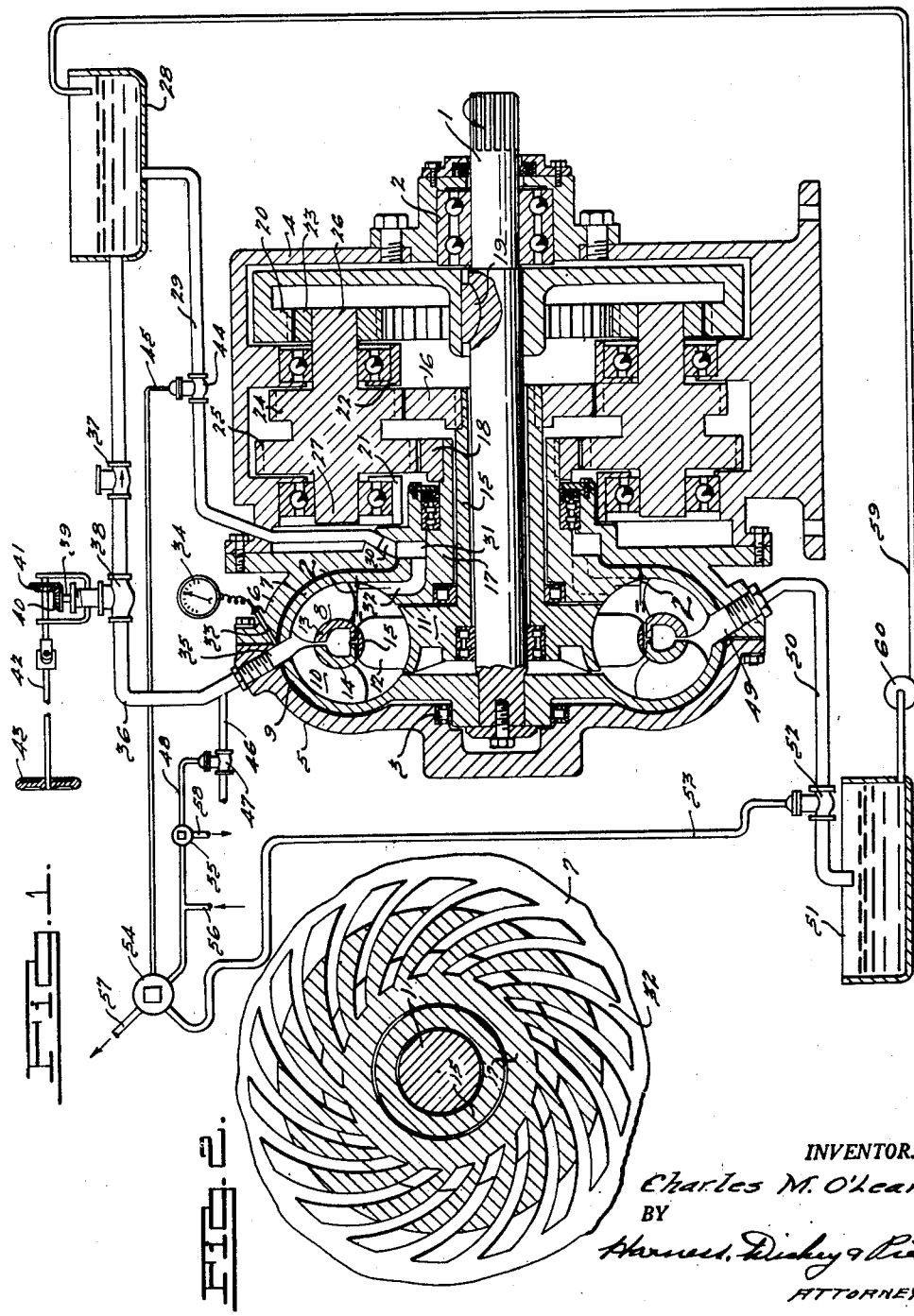
INVENTOR.
Charles M. O'Leary.
BY
ATTORNEYS.

Patented Feb. 21, 1950

2,498,572

UNITED STATES PATENT OFFICE 2,498,572

HYDROKINETIC BRAKE

Charles M. O'Leary, Los Angeles, Calif.

Application September 8, 1947, Serial No. 772,714

8 Claims. (Cl. 188—90)

1

The present invention relates to a hydrokinetic brake for rotating shafts and particularly a brake of the type mentioned which is peculiarly suited for use as a brake on the hoisting drum in oil well drilling machines. The present invention is an improvement of the mechanism disclosed in applicant's copending application on "Hydrokinetic brake," Serial No. 733,039, filed March 7, 1947, now Patent Number 2,491,329.

In said prior copending application is disclosed a hydrokinetic brake incorporating a hydrokinetic torque dissipating unit in the form of a more or less conventional hydrokinetic torque converter. Such converters comprise a closed liquid flow circuit containing a centrifugal pump element, one or more stages of turbine blades, and a corresponding number of normally stationary reaction blades. In said prior application, the energy of the rotating shaft is dissipated by connecting it to the centrifugal pump element and the turbine element in such a manner that the rotating shaft drives said elements in opposite directions at different speeds.

It is one object of the present invention to increase the energy absorbing capacity of a hydrokinetic torque converter brake of the type mentioned by additionally rotating the normally stationary reaction blades from the shaft to be braked in a direction opposite to the force exerted thereon by the circulating liquid.

Another object of the present invention is to provide an improved means for controlling the extent to which the hydrokinetic unit is filled with liquid and the temperature of said liquid.

Another object of the present invention is to provide a simplified drive mechanism connecting the shaft to be braked to the centrifugal pump element, the turbine element and the reaction blades in such a manner as to rotate all three elements, the centrifugal pump element and reaction blades being rotated in a direction opposite to that of the turbine element and the centrifugal pump element being rotated at a higher speed than either of the other elements.

Another object of the invention is to provide improved means for preventing cavitation in a hydrokinetic torque absorbing or transmitting device.

Other objects and advantages of the invention will become apparent from the following specification, the drawing relating thereto and the claims hereinafter set forth.

In the drawing:

Figure 1 is a longitudinal section through the improved hydrokinetic brake with the external liquid flow circuits and controls shown in a schematic manner; and Figure 2 is a fragmentary section taken on the line 2—2 of Figure 1.

As shown in the drawing, the mechanism of the present invention includes a main shaft 1 which is adapted to be connected in any suitable manner to a rotary shaft to be braked, such as the shaft of the hoisting drum of an oil well drilling machine.

The shaft 1 is journaled by means of bearings 2 and 3 on a sectional casing consisting of a gear housing 4 and a housing for a hydrokinetic torque absorbing unit comprised of a pair of sections 5 and 6. Positioned within the housing sections 5 and 6 is a more or less conventional single stage hydrokinetic torque converter consisting of a centrifugal pump impeller 7 carrying a plurality of blades 8, a hydraulic turbine element 9 carrying a plurality of blades 10, and an annular member 11 carrying a plurality of reaction blades 12. The casing and the members 7, 9 and 11 define a torus-shaped cavity within which is positioned a torus-shaped core formed by annular members 13, 14 and 15 fixed, respectively, on the inner edges of the blades 8, 10 and 12. As in all torque converters of this type, it will be understood that on rotation of the centrifugal pump impeller 7 relative to the turbine element 9 and the reaction blades 12, the liquid within the casing will be circulated in a spiral path around the torus-shaped core and will act, in turn, upon the turbine blades and the reaction blades.

The general arrangement and form of the blades 8, 10 and 12 may be generally similar to those of the blades conventionally employed in hydrokinetic torque converters used for the transmission of power. It will be understood that when so used, power is supplied to the centrifugal pump element hydrokinetically transmitted to the turbine element. Because of the normally stationary reaction blades 12, such converters are capable of multiplying torque; that is to say, the torque delivered by the turbine is higher than that delivered to the pump and the speed of the turbine is less than that of the pump. The reaction blades redirect the fluid discharged from the turbine blades and thus are subject to a force tending to rotate them in the same direction as that in which the turbine is rotated.

In accordance with the present invention, the hydraulic turbine element 9 is fixed to shaft 1. The annular reaction member 11 is fixed to a sleeve 15 which is journaled upon the shaft 1 and carries a fixed spur gear 16. The centrifugal pump element 7 is fixed to a sleeve 17, which is journaled on a sleeve 15 and carries a fixed spur gear 18. Within casing section 4, shaft 1 is fixed by means of a key 19 to the hub of an internal gear 20. The interior of the casing 4 is provided with a pair of inwardly projecting annular webs 21 and 22 in which are journaled four identical gear clusters which have the axes parallel to the axis of shaft 1 and which are equally spaced circumferentially around the shaft 1. Each of the gear clusters comprises three spur gears 23, 24 and 25, gear 23 being keyed to a projecting stub shaft 26 of the cluster and gears 24 and 25 being formed integrally with the stub shaft 26 and a stub shaft 27 at the opposite end of the cluster.

Each of the gears 23 meshes with internal gear 20, each of the gears 24 meshes with the spur gear 16, and each of the gears 25 meshes with the spur gear 18. As a result of these connections, rotation of shaft 1 in a counterclockwise direction, as viewed from the right-hand end of the shaft, will rotate the centrifugal pump element 7 and the annular reaction member 11 in a clockwise direction and at the same time rotate the turbine element 9 in a counterclockwise direction. The relative sizes of the gears 16, 18, 20, 23, 24 and 25 are such that the centrifugal pump element is rotated at a speed substantially in excess of the speed of rotation of the shaft 1, preferably three or more times the speed of the latter, and the annular reaction element 11 is rotated in the same direction as the centrifugal pump element but at a lower speed. Rotation of the centrifugal pump element at higher speed than that of the other elements insures a rapid circulation of the liquid within the converter housing and also insures that the torque transmitted to the turbine by the liquid will be substantially greater than that delivered to the pump. Since both the turbine element 9 and the reaction member 11 are rotated by the shaft 1 in a direction opposite to that in which the circulating fluid tends to rotate said elements, they both exert substantial resistance to the rotation of the shaft. The total braking torque applied to the shaft is the torque required to rotate the centrifugal pump 7 multiplied by the speed multiplication through the gearing connecting the pump to the shaft 1 (at least three to one), plus the torque required to rotate the turbine 9 and the reaction blades 12. Since the torque delivered to the turbine 9 by the fluid discharged by pump 7 is greater than the torque required to rotate the pump, the total braking torque is correspondingly increased. The torque imposed upon the reaction blades 12 is likewise added to the total braking force, thus providing a very high braking torque for a given size unit.

In order to obtain maximum braking force, it is necessary to insure that all of the space within the housing sections 5 and 6 is filled with liquid and, since the energy absorbed by the brake is transmitted to the liquid in the form of heat, it is necessary to circulate and cool the operating liquid of the converter during the braking operation. Accordingly, the mechanism incorporates suitable means to control the rate of circulation. As shown diagrammatically in Figure 1, the apparatus includes a suitable source of cooled liquid represented by the tank 28, which is connected by means of a pipe 29 to an inlet port 30 formed in the casing section 6 adjacent the inner portion of the pump impeller 7. Port 30 communicates with an annular inlet chamber 31 surrounding the sleeve 17. Chamber 31 is connected to the torus-shaped cavity within the converter by means of a plurality of passageways 32 formed in the impeller element 7. As best shown in Figure 2, passageways 32 extend outwardly from the axis of the shaft 1 into the torus-shaped cavity and are curved rearwardly in volute fashion with respect to the direction of rotation of the pump impeller, with the result that the portion of the pump impeller 7 which incorporates the passageways 32 is in effect a centrifugal pump which draws the liquid from the annular chamber 31 and delivers it under pressure to the torus-shaped cavity. This serves to maintain the operating liquid of the converter under pressure and thus prevent cavitation. This feature of the invention is of utility not only in connnection with hydrokinetic brakes, but in any hydrokinetic torque transmitting device.

The torque converter is fitted with a temperature indicating device which, as shown, is in the form of a thermocouple 33 having its operative end in connection with the liquid within the torus-shaped cavity and which is connected to a suitable indicating dial 34 from which the operator may at any time ascertain the temperature of the liquid and thus determine whether it is necessary to increase the rate of flow of liquid to prevent overheating. The converter is provided with a discharge port 35 which is connected by means of a pipe 36 to the tank 28 or other suitable cooling mechanism. Pipe 36 contains a conventional check valve 37 adapted to prevent return flow of liquid from the tank 28 to the converter, and it also contains a throttle valve 38, the opening and closing movements of which are effected by rotation of the valve stem 39, the stem being connected by means of a pair of bevel gears 40 and 41 and a universally jointed shaft 42 to a hand wheel 43, which may be located in any convenient location.

During normal operation of the mechanism as a brake, there is a continuous flow of fluid from tank 28 through pipe 29 to the converter and thence outwardly through pipe 36 to the tank, the rate of flow being controlled by operation of the hand wheel 43 to prevent overheating of the liquid. The pipe 29 contains a normally closed air-operated shut-off valve 44, which is held open during braking operations by application of air under pressure through a pipe 45.

When the converter is empty or partially empty and it is desired to fill the same with liquid, it is necessary to vent any air that may exist within the torus-shaped cavity. This is accomplished by means of a vent line 46, which is controlled by an air-operated shut-off valve 47. Valve 47 is normally closed, but is opened on application of air under pressure through pipe 48.

The braking force exerted by the unit may be varied or adjusted by controlling the amount of liquid within the torus-shaped cavity. For this purpose, the converter is provided with a drain port 49, which is connected by means of a pipe 50 to an auxiliary tank 51. Pipe 50 contains an air-operated valve 52, which is normally closed but which is opened on application of air under pressure through line 53.

The supply of air for controlling the operation of valves 44, 47 and 52 is controlled by a pair of manually-operated valves 54 and 55. The valve 54, which is illustrated diagrammatically, is a four-way valve which is connected at one port to a source of air under pressure associated with a pipe 56 and which has a second port 57 connected to the atmosphere for exhaust. In one position, the valve 54 connects the pressure line 56 to line 45 and the exhaust line 57 to line 53. When the valve 54 is shifted, these connections are reversed, thus connecting pipe 56 to pipe 53 and connecting pipe 45 to the exhaust pipe 57. Accordingly, when it is desired to fill the converter or maintain it in filled condition, valve 54 is turned to the first mentioned position. This supplies air under pressure through pipe 45 to the normally closed air-operated valve 44, causing the same to open and permit the flow of operating liquid to the converter. At the same time, pipe 56 is connected to pipe 53, thus permitting closure of the normally closed air-operated valve 52 in the drainpipe 50. During this filling operation, valve 47 may be opened at any time by operation of air valve 55, which normally connects pipe 48 to an exhaust pipe 58 but which may on operation connect the pressure line 56 to the pipe 48 and thus open the normally closed valve 47. When it is desired to drain all or a portion of the liquid in the converter, valve 54 is shifted to its second position, thus closing valve 44 and opening valve 52. To increase the rate of draining when the mechanism is stationary, the air vent valve 47 may be opened.

It will be understood that when the hoisting drum which is attached to shaft 1 is used for hoisting purposes, the braking effect of the apparatus should be reduced to a minimum. This may be achieved by draining all of the liquid from the converter, or, if desired, by connecting the hoisting drum to shaft 1 by a one-way clutch of any suitable or conventional form.

In the mechanism shown in the drawings, two separate tanks 28 and 51 are illustrated, the arrangement being such that the liquid may flow by gravity from tank 28 to the converter and thence from the converter to tank 51, the liquid in tank 51, in turn, being returned to the tank 28 by means of a pipe 59 containing a centrifugal pump, as shown diagrammatically at 60. It will be appreciated, however, that tank 28 represents diagrammatically any conventional means to cool the operating liquid. Thus, it may comprise either a radiator or a cooling tower through which liquid flowing from pipe 36 to pipe 29 passes. Moreover, the pipe 36 may be connected to tank 51, if desired, in which event the liquid discharged through pipe 36 will flow through tank 51 and pipe 59 and the cooler 28 before returning to the converter.

It will be appreciated that there is provided in accordance with the present invention a hydrokinetic brake of exceedingly high braking torque capacity which may be readily controlled from a single operation station by means of a hand wheel 43 and manually-operated valves 54 and 55.

While only one form of the invention is illustrated, it will be apparent that variations in the design and details of the construction may be indulged in without departing from the spirit of the invention and the scope of the appended claims.

What is claimed is:

1. A hydrokinetic brake for a rotating shaft, including a hydrokinetic torque converter provided with centrifugal pump blading and turbine blading, said converter having means including a casing defining a continuous liquid flow path through said sets of blading in series, reaction blading in said flow path for redirecting liquid discharged by the turbine blading, a rotary member adapted to be connected to the shaft to be braked, a mechanical drive connection between the turbine blading and said member adapted to rotate said blading in one direction relative to said member, and mechanical drive connections between said member and said pump blading and said reaction blading for rotating the pump blading and reaction blading in a direction opposite to the rotation of said turbine blading.

2. A hydrokinetic brake for a rotating shaft, including a hydrokinetic torque converter provided with centrifugal pump blading and turbine blading, said converter having means including a casing defining a continuous liquid flow path through said sets of blading in series, reaction blading in said flow path for redirecting liquid discharged by the turbine blading, a rotary member adapted to be connected to the shaft to be braked, a mechanical drive connection between the turbine blading and said member adapted to rotate said blading in one direction relative to said member, and mechanical drive connections between said member and said pump blading and said reaction blading for rotating the pump blading and reaction blading in a direction opposite to the rotation of said turbine blading, said mechanical connections being effective to rotate the pump blading at a higher speed than said turbine blading.

3. A hydrokinetic brake for a rotating shaft, including a hydrokinetic torque converter provided with centrifugal pump blading and turbine blading, said converter having means including a casing defining a continuous liquid flow path through said sets of blading in series, reaction blading in said flow path for redirecting liquid discharged by the turbine blading, a rotary member adapted to be connected to the shaft to be braked a mechanical drive connection between the turbine blading and said member adapted to rotate said blading in one direction relative to said member, and mechanical drive connections between said member and said pump blading and said reaction blading for rotating the pump blading and reaction blading in a direction opposite to the rotation of said turbine blading, said mechanical connections being effective to rotate the pump blading at a higher speed than said turbine blading and at a higher speed than said reaction blading.

4. A hydrokinetic brake for a rotating shaft, including a hydrokinetic torque converter provided with centrifugal pump blading and turbine blading, said converter having means including a casing defining a continuous liquid flow path through said sets of blading in series, reaction blading in said flow path for redirecting liquid discharged by the turbine blading, a rotary member adapted to be connected to the shaft to be braked, said turbine blading being fixed with respect to said shaft, a reversing geared drive connection between said member and said pump blading for rotating the pump blading in a direction opposite to the turbine blading and at a higher speed, and a reversing geared drive connection between said member and said reaction blading for rotating said reaction blading in a direction opposite to that of the turbine blading.

5. A hydrokinetic brake for a rotating shaft, including a hydrokinetic torque converter provided with centrifugal pump blading and turbine blading, said converter having means including a casing defining a continuous liquid flow path through said sets of blading in series, reaction blading in said flow path for redirecting liquid discharged by the turbine blading, a rotary member adapted to be connected to the shaft to be braked, said turbine blading being fixed with respect to said member, a reversing geared drive connection between said member and said pump blading for rotating the pump blading in a direction opposite to the turbine blading and at a higher speed, and a reversing geared drive connection between said member and said reaction blading for rotating said reaction blading in a direction opposite to that of the turbine blading but at a lower speed than that of the pump blading.

6. A hydrokinetic torque reaction device having means including a casing defining a continuous annular closed liquid flow path and independently rotatable centrifugal pump and turbine impellers having blades positioned in said path for coaction with liquid flowing therein, said casing defining an annular inlet chamber separate from said path and coaxial therewith and positioned closer to the axis than said path, said pump impeller having a plurality of passageways therethrough connecting the annular inlet chamber with the inner portion of the annular path, said passageways each extending toward the path in a direction outwardly from the axis of said path whereby they function as a centrifugal pump to maintain the liquid in said path under pressure when the pump impeller is rotated.

7. A hydrokinetic torque reaction device having means including a casing defining a continuous annular closed liquid flow path and independently rotatable centrifugal pump and turbine impellers having blades positioned in said path for coaction with liquid flowing therein, said casing defining an inlet chamber separate from said path and coaxial therewith and positioned closer to the axis than said path, said pump impeller having a plurality of passageways therethrough connecting the annular inlet chamber with the inner portion of the annular path, said passageways each extending toward the path in a direction outwardly from the axis of said path and being curved in volute fashion whereby they function as a centrifugal pump to maintain the liquid in said path under pressure when the pump impeller is rotated.

8. In a hydrokinetic brake for a rotary shaft, means including a casing defining a closed continuous liquid flow path, three independently rotatable impeller members each having blades adapted to react with liquid circulating in said path, a shaft adapted for connection to the shaft to be braked, and mechanical driving connections between said shaft and said impellers for driving all of said impellers at different speeds relative to each other, said driving connections being effective to rotate one of said impellers at a higher speed than either of the other two impellers and being effective to rotate said other two impellers in directions opposite to that in which the liquid delivered by the first impeller tends to rotate said other impellers.

CHARLES M. O'LEARY.

REFERENCES CITED

The following references are of record in the file of this patent:

UNITED STATES PATENTS

| Number | Name | Date |
| --- | --- | --- |
| 862,017 | Riggs | July 30, 1907 |
| 2,260,015 | Fichtner | Oct. 21, 1941 |
| 2,292,385 | Lysholm | Aug. 11, 1942 |
| 2,318,660 | Barrett | May 11, 1943 |
| 2,341,122 | Schmidt | Feb. 8, 1944 |
| 2,429,989 | Buckendale | Nov. 4, 1947 |